US010280272B2

(12) United States Patent
Ekinaka et al.

(10) Patent No.: US 10,280,272 B2
(45) Date of Patent: May 7, 2019

(54) LAMINATE HAVING A TOP COAT LAYER CONTAINING FLAKY METAL OXIDE FINE PARTICLES

(71) Applicants: TEIJIN LIMITED, Osaka (JP); CENTRAL JAPAN RAILWAY COMPANY, Aichi (JP)

(72) Inventors: Tatsuya Ekinaka, Tokyo (JP); Takehiro Suga, Tokyo (JP); Toshio Kita, Tokyo (JP); Ryo Niimi, Tokyo (JP); Yuta Toyoshima, Tokyo (JP); Tetsuya Shichi, Aichi (JP); Daisuke Yoshioka, Aichi (JP); Makoto Yamashita, Aichi (JP); Sohei Okazaki, Aichi (JP); Yuji Kaneko, Aichi (JP)

(73) Assignee: TEIJIN LIMITED, Osaka (JP)

( * ) Notice: Subject to any disclaimer, the term of this patent is extended or adjusted under 35 U.S.C. 154(b) by 211 days.

(21) Appl. No.: 14/377,303

(22) PCT Filed: Feb. 20, 2013

(86) PCT No.: PCT/JP2013/055026
§ 371 (c)(1),
(2) Date: Aug. 7, 2014

(87) PCT Pub. No.: WO2013/125724
PCT Pub. Date: Aug. 29, 2013

(65) Prior Publication Data
US 2015/0037566 A1 Feb. 5, 2015

(30) Foreign Application Priority Data

Feb. 21, 2012 (JP) ................. 2012-034866
Feb. 21, 2012 (JP) ................. 2012-034867
Feb. 21, 2012 (JP) ................. 2012-034868

(51) Int. Cl.
*C08J 7/04* (2006.01)
*C23C 26/00* (2006.01)
*B05D 3/02* (2006.01)
*B05D 3/14* (2006.01)
*B05D 3/04* (2006.01)
*B05D 3/06* (2006.01)
*B05D 7/00* (2006.01)

(52) U.S. Cl.
CPC .............. *C08J 7/04* (2013.01); *B05D 3/0473* (2013.01); *B05D 7/54* (2013.01); *C23C 26/00* (2013.01); *B05D 3/029* (2013.01); *B05D 3/0263* (2013.01); *B05D 3/068* (2013.01); *B05D 3/145* (2013.01); *B05D 3/147* (2013.01); *B05D 2425/01* (2013.01); *C08J 2333/04* (2013.01); *C08J 2383/04* (2013.01); *Y10T 428/25* (2015.01); *Y10T 428/256* (2015.01); *Y10T 428/257* (2015.01); *Y10T 428/258* (2015.01); *Y10T 428/259* (2015.01)

(58) Field of Classification Search
CPC ........ B05D 3/0473; B05D 7/54; B05D 3/147; B05D 3/0263; B05D 3/068; B05D 3/029; B05D 3/145; C08J 7/04; C08J 2383/04; C08J 2333/04; C23C 26/00
See application file for complete search history.

(56) References Cited

U.S. PATENT DOCUMENTS

| | | | |
|---|---|---|---|
| 6,777,070 B1 * | 8/2004 | Murata | ................ C08F 259/08 428/323 |
| 2001/0024718 A1 | 9/2001 | Sasaki | |
| 2003/0096119 A1 * | 5/2003 | Kimura | ..................... C08J 7/04 428/412 |
| 2004/0247878 A1 | 12/2004 | Imanaka | |
| 2008/0171224 A1 | 7/2008 | Yamamoto et al. | |
| 2008/0280103 A1 | 11/2008 | Uetsuka et al. | |
| 2009/0104447 A1 | 4/2009 | Kita et al. | |
| 2010/0166548 A1 | 7/2010 | Sayano et al. | |
| 2012/0114518 A1 | 5/2012 | Hara et al. | |

FOREIGN PATENT DOCUMENTS

| | | |
|---|---|---|
| EP | 1 033 347 | 9/2000 |
| EP | 1 283 107 | 2/2003 |
| EP | 1 419 994 | 5/2004 |
| EP | 1 491 498 | 12/2004 |
| EP | 1 857 499 | 11/2007 |
| EP | 1 860 166 | 11/2007 |
| EP | 1 918 338 | 5/2008 |
| JP | 6-172508 | 6/1994 |
| JP | 8-27370 | 1/1996 |

(Continued)

OTHER PUBLICATIONS

European Search Report dated Jul. 11, 2016 in corresponding European Application 13752448.4.
European Search Report dated Mar. 30, 2016 in corresponding European Application 13752448.4.
Matsuda et al., "Preparation of Titania Nanosheet-Precipitated Coatings on Glass Substrates by Treating $SiO_2$—$TiO_2$ Gel Films with Hot Water Under Vibrations", Journal of Sol-Gel Science and Technology, vol. 31, 2004, pp. 229-233.

(Continued)

*Primary Examiner* — Cheng Yuan Huang
(74) *Attorney, Agent, or Firm* — Wenderoth, Lind & Ponack, L.L.P.

(57) ABSTRACT

A laminate having excellent abrasion resistance to physical stimuli such as dust. The laminate comprises a base layer, a hard coat layer and a top coat layer comprising flaky metal oxide fine particles all of which are formed in this order. The flaky metal oxide fine particles are hardened by at least one method selected from the group consisting of ionizing material exposure, ionizing radiation exposure, infrared exposure, microwave exposure and high-temperature vapor exposure.

4 Claims, No Drawings

(56) References Cited

FOREIGN PATENT DOCUMENTS

| | | |
|---|---|---|
| JP | 2000-284108 | 10/2000 |
| JP | 2001-55435 | 2/2001 |
| JP | 2002-60689 | 2/2002 |
| JP | 2002-117580 | 4/2002 |
| JP | 2002-129003 | 5/2002 |
| JP | 2003-025478 | 1/2003 |
| JP | 2003-326649 | 11/2003 |
| JP | 2004-111348 | 4/2004 |
| JP | 2005-186035 | 7/2005 |
| JP | 2005-290369 | 10/2005 |
| JP | 2006-43976 | 2/2006 |
| JP | 2006-047720 | 2/2006 |
| JP | 2006-206841 | 8/2006 |
| JP | 2006-272757 | 10/2006 |
| JP | 2009-95764 | 5/2009 |
| JP | 2010-219075 | 9/2010 |
| JP | 2011-68122 | 4/2011 |
| WO | 2004/000551 | 12/2003 |
| WO | 2007/105741 | 9/2007 |

OTHER PUBLICATIONS

International Preliminary Report on Patentability dated Aug. 26, 2014 in International (PCT) Application No. PCT/JP2013/055026.
International Search Report dated May 14, 2013 in International (PCT) Application No. PCT/JP2013/055026.

* cited by examiner

LAMINATE HAVING A TOP COAT LAYER CONTAINING FLAKY METAL OXIDE FINE PARTICLES

TECHNICAL FIELD

The present invention relates to a laminate having a top coat layer which is excellent in abrasion resistance to physical stimuli such as dust. Also, it relates to a method of forming a topcoat layer having excellent abrasion resistance on a substrate. Further, it relates to a substrate for forming a top coat layer.

BACKGROUND ART

Plastics are used in various fields such as auto parts, home electric appliance parts, housings, containers, films and sheets as they are lightweight and excellent in moldability. Especially transparent plastics are used in windows, optical lenses, mirrors, spectacles, goggles, sound insulation walls, lenses for traffic lamps, lenses for head lamps, curve mirrors, windshields and face plates. However, since plastics are unsatisfactory in terms of surface abrasion resistance, they are easily scratched during use and hence deteriorate in mechanical properties due to scratching.

To compensate for this defect, there is proposed a laminate which has a hard coat layer containing melamine resin, siloxane resin or (meth)acrylic resin on the surface of a plastic (Patent Document 1). However, it is unsatisfactory in terms of abrasion resistance to physical stimuli such as dust, and the further improvement of abrasion resistance has been desired.

Meanwhile, to provide hardness for physical stimuli such as dust, there is proposed a laminate produced by baking a coating agent containing flaky titanium oxide fine particles (titania nanosheets) on the surface of a substrate (Patent Document 2). However, this laminate is unsatisfactory in terms of abrasion resistance to physical stimuli such as dust, and the further improvement of abrasion resistance has been desired. According to Patent Document 2, the hardness of the nanosheet greatly differs according to the baking temperature, and unless the nanosheet is baked at 400° C. or higher, satisfactory hardness is not obtained, whereby even when the nanosheet is used in a plastic, it is unknown whether a satisfactory effect in terms of hardness is obtained or not.

In a hard coat film having a hard coat layer and a functionalizing layer all of which are formed on the surface of a film in the mentioned order, to improve the repelling of the functionalizing layer and adhesion between resin layers, it is proposed to hydrophilize the surface of the hard coat layer (Patent Document 3). However, it is desired to improve abrasion resistance even for this film having a hard coat layer.
(Patent Document 1) WO2007/105741
(Patent Document 2) JP-A 2005-290369
(Patent Document 3) JP-A 2003-326649

DISCLOSURE OF THE INVENTION

It is an object of the present invention to obtain a laminate which has excellent abrasion resistance to physical stimuli such as dust. It is another object of the present invention to provide a method of forming a top coat layer having excellent abrasion resistance to physical stimuli such as dust on a substrate without baking it at a high temperature. It is still another object of the present invention to provide a substrate which can achieve excellent abrasion resistance and antifouling property when a top coat layer is formed by hardening flaky metal oxide fine particles on the substrate.

The present invention is a laminate comprising a base layer, a hard coat layer and a top coat layer containing flaky metal oxide fine particles all of which are formed in the mentioned order.

Also, the present invention is a method of forming a top coat layer containing flaky metal oxide fine particles on a substrate, comprising the steps of:
(step-i) preparing a substrate;
(step-ii) applying a dispersion of flaky metal oxide fine particles to the substrate to form a coating layer;
(step-iii) drying the coating layer to form a dry layer; and
(step-iv) hardening the flaky metal oxide fine particles contained in the dry layer by at least one method selected from the group consisting of ionizing material exposure, ionizing radiation exposure, infrared exposure, microwave exposure and high-temperature vapor exposure to form a top coat layer.

Further, the present invention is a substrate for forming a top coat layer containing flaky metal oxide fine particles, which comprises a base layer and a hydrophilized hard coat layer all of which are formed in the mentioned order, wherein
the hard coat layer is formed from (i) a hard coating agent containing colloidal silica and/or an alkoxysilane hydrolyzed condensate in an amount of not less than 30 wt % based on the total weight of the hard coating agent excluding a solvent; and has (ii) a water contact angle of 30° or less.

BEST MODE FOR CARRYING OUT THE INVENTION

The present invention is described in detail hereinunder.
[Laminate]
The laminate of the present invention comprises a base layer, a hard coat layer and a top coat layer containing flaky metal oxide fine particles all of which are formed in the mentioned order.
<Base Layer>
In the present invention, the base layer is a plastic molded body having a thickness of preferably 0.05 to 20 mm, more preferably 1 to 10 mm.

The plastic is not particularly limited and examples thereof include polyolefin resins such as polyethylene and polypropylene, amorphous polyolefin resins such as polydicyclopentadiene, polycarbonate resins, acrylic resins such as polymethyl methacrylate, polyester resins such as polyethylene terephthalate, polybutylene terephthalate and poly(ethylene-2,6-naphthalate), polystyrene, polyarylate, polyether sulfone, polyether ether ketone, polyimide, phenolic resins and urea resins. Out of these, polycarbonate resins, acrylic resins such as polymethyl methacrylate, polyester resins such as polyethylene terephthalate, polybutylene terephthalate and poly(ethylene-2,6-naphthalate), polystyrene, polypropylene, polyarylate and polyether sulfone all of which have excellent transparency are preferred. The base layer is preferably formed from a thermoplastic resin. The plastic is preferably a polycarbonate resin having high impact strength.

The polycarbonate resin may be a polycarbonate resin having high heat resistance or a low water absorption coefficient obtained by polymerizing a dihydric phenol, or a polycarbonate resin having high heat resistance obtained by polymerizing an aliphatic diol, besides bisphenol A type polycarbonates. The polycarbonate resin may be produced by any production process. In the case of interfacial polycondensation, a monohydric phenol end-sealing agent is generally used. The polycarbonate resin may be a branched polycarbonate resin obtained by polymerizing a trifunctional phenol, or a copolycarbonate obtained by copolymerizing an aliphatic dicarboxylic acid, aromatic dicarboxylic acid or divalent aliphatic or alicyclic alcohol. When the viscosity average molecular weight of the polycarbonate resin is 13,000 to 40,000, it can be used in a wide variety of fields. When the viscosity average molecular weight is lower than 20,000, it has excellent flowability and can be suitably used in large-sized resin molded articles having a complex shape (for example, back door windows) out of resin windows for vehicles. When the viscosity average molecular weight is not lower than 20,000, it has excellent strength and is preferably used in all resin windows for vehicles. In the resin windows for vehicles which are the preferred application field of the present invention, it is necessary to select the molecular weight according to a molded article of interest. Since the resin sheet of the present invention is thick, its distortion at the time of molding falls within the permissible range even when the polycarbonate resin has a relatively high molecular weight. The upper limit of viscosity average molecular weight is preferably 35,000, more preferably 30,000 from the viewpoint of versatility.

This viscosity average molecular weight should be satisfied by the whole polycarbonate resin or a mixture of two or more polycarbonates having different molecular weights. Mixing of a polycarbonate having a viscosity average molecular weight higher than 50,000 (preferably 80,000 or higher, more preferably 100,000 or higher) may be advantageous as the polycarbonate increases entropy elasticity at the time of melting. For example, it serves to suppress jetting in the present invention. This effect obtained by improving entropy elasticity is more marked as the molecular weight of the polycarbonate becomes higher. From the practical point of view, the upper limit of molecular weight is 2,000,000, preferably 300,000, more preferably 200,000. When this polycarbonate resin is used in an amount of 0.5 to 20 wt %, preferably 1 to 10 wt %, a predetermined effect is obtained without impairing moldability.

The viscosity average molecular weight (M) of the polycarbonate resin is obtained by inserting specific viscosity ($\eta_{sp}$) obtained from a solution prepared by dissolving 0.7 g of the polycarbonate resin in 100 ml of methylene chloride at 20° C. into the following expression. As for the details of the polycarbonate resin, refer to JP-A 2002-129003.

$\eta_{sp}/c=[\eta]+0.45\times[\eta]^2 c$ ($[\eta]$ represents an intrinsic viscosity)

$[\eta]=1.23\times10^{-4} M^{0.83}$ c=0.7

Preferred examples of the polycarbonate resin having high heat resistance or a low water absorption coefficient obtained by polymerizing a dihydric phenol are given below.
(1) A copolycarbonate which comprises 20 to 80 mol % (preferably 40 to 75 mol %, more preferably 45 to 65 mol %) of
4,4'-(m-phenylenediisopropylidene)diphenol (to be abbreviated as "BPM" hereinafter) and 20 to 80 mol % (preferably 25 to 60 mol %, more preferably 35 to 55 mol %) of 9,9-bis(4-hydroxy-3-methylphenyl)fluorene (to be abbreviated as "BCF" hereinafter) based on 100 mol % of the dihydric phenol component constituting the polycarbonate.
(2) A copolycarbonate which comprises 10 to 95 mol % (preferably 50 to 90 mol %, more preferably 60 to 85 mol %) of bisphenol A and 5 to 90 mol % (preferably 10 to 50 mol %, more preferably 15 to 40 mol %) of BCF based on 100 mol % of the dihydric phenol component constituting the polycarbonate.
(3) A copolycarbonate which comprises 20 to 80 mol % (preferably 40 to 75 mol %, more preferably 45 to 65 mol %) of BPM and 20 to 80 mol % (preferably 25 to 60 mol %, more preferably 35 to 55 mol %) of
1,1-bis(4-hydroxyphenyl)-3,3,5-trmethylcyclohexane based on 100 mol % of the dihydric phenol component constituting the polycarbonate.
(4) A copolycarbonate which comprises 40 to 90 mol % (preferably 50 to 80 mol %) of
2,2-bis(4-hydroxy-3-methylphenyl)propane (to be abbreviated to as "bisphenol C" hereinafter) and 10 to 60 mol % (preferably 20 to 50 mol %) of bisphenol A based on 100 mol % of the dihydric phenol component constituting the polycarbonate.

Examples of the polycarbonate resin having high heat resistance obtained by polymerizing an aliphatic diol include polycarbonates obtained from isosorbide, isomannide and isoidide as the aliphatic diol constituting the polycarbonate. Out of these, polycarbonates obtained from isosorbide (1,4; 3,6-dianhydro-D-sorbitol) are particularly preferred because they are easily produced and have excellent heat resistance.

These special polycarbonates may be used alone or in combination of two or more. They may be mixed with a widely used bisphenol A type polycarbonate.

The production processes and characteristic properties of these special polycarbonates are detailed in, for example, JP-A 6-172508, JP-A 8-27370, JP-A 2001-55435 and JP-A 2002-117580.

The above thermoplastic resins may contain conventionally known additives as long as the above transparency is not impaired. The additives include a heat stabilizer, antioxidant, ultraviolet absorbent, optical stabilizer, colorant, release agent, sliding agent, infrared absorbent, light diffusing agent, fluorescent brightener, antistatic agent, flame retardant, flame retarding aid, plasticizer, reinforcing filler, impact modifier, photocatalyst-based antifouling agent and photochromic agent. The heat stabilizer, antioxidant, ultraviolet absorbent, optical stabilizer, colorant and release agent may be used in appropriate amounts which are conventionally known in the above thermoplastic resins.

<Hard Coat Layer>

In the present invention, the hard coat layer is formed on the base layer. Although the hard coating agent used in the hard coat layer is not particularly limited, a silicone resin-based hard coating agent or an organic resin-based hard coating agent is used.

The silicone resin-based hard coating agent is used to form a cured resin layer having a siloxane bond, and examples thereof include a partially hydrolyzed condensate of a compound containing a compound (such as trialkoxysilane compound) corresponding to a trifunctional siloxane unit as the main component, preferably a partially hydrolyzed condensate containing a compound (such as tetraalkoxysilane compound) corresponding to a tetrafunctional siloxane unit, and a partially hydrolyzed condensate obtained by loading the above condensate with metal oxide fine particles such as colloidal silica. The silicone resin-based hard coating agent may further contain a bifunctional siloxane unit and a monofunctional siloxane unit. The silicone resin-based hard coating agent contains an alcohol (in the case of an alkoxysilane partially hydrolyzed condensate) produced at the time of a condensation reaction and may be optionally dissolved or dispersed in an arbitrary organic solvent, water or a mixture thereof. Examples of the organic solvent include lower fatty acid alcohols, polyhydric alcohols, and ethers and esters thereof. A surfactant for obtaining a smooth surface state, for example, a siloxane-based or alkyl fluoride-based surfactant may be added to the hard coat layer.

The hard coating agent preferably contains colloidal silica and/or an alkoxysilane hydrolyzed condensate in an amount of not less than 30 wt % based on the total weight of the hard coating agent excluding a solvent. The content of the colloidal silica and/or alkoxysilane hydrolyzed condensate is more preferably not less than 50 wt %, much more preferably 70 wt %. Above the lower limit, when the flaky metal oxide fine particles containing an element having metal catalyst performance as a constituent element are hardened on the hard coat layer, excellent antifouling property and abrasion resistance are obtained advantageously.

Since the flaky metal oxide fine particles have charge themselves and a structure that they have an M—O—H group on the surface, they have high affinity for Si—O—H. Therefore, it is assumed that the orientation of the flaky metal oxide fine particles is excellent and antifouling property is improved.

A hard coating agent containing colloidal silica and/or an alkoxysilane hydrolyzed condensate in an amount of not less than 30 wt % can be obtained by mixing a silicone resin-based hard coating agent or an organic resin-based hard coating agent with organic solvent dispersible colloidal silica.

The silicone resin-based hard coating agent may be selected from among a two-coat type consisting of a primer layer and a top layer and a one-coat type consisting of only one layer.

Examples of the resin forming the primer layer (first layer) include urethane resins comprising a block isocyanate component and a polyol component, acrylic resins, polyester resins, epoxy resins, melamine resins, amino resins and polyfunctional acrylic resins such as polyester acrylate, urethane acrylate, epoxy acrylate, phosphagen acrylate, melamine acrylate and amino acrylate. They may be used alone or in combination of two or more. Out of these, a hard coating agent containing an acrylic resin or a polyfunctional acrylic resin in an amount of 50 wt %, preferably not less than 60 wt % is preferred. A hard coating agent containing an acrylic resin or urethane acrylate is particularly preferred. After the resin is applied while it is unreacted, it may be reacted to become a cured resin, or the reacted resin may be directly applied to form a cured resin layer. In the latter case, the resin is dissolved in a solvent to prepare a solution which is then applied and then the solvent is removed. In the former case, the solvent is also used generally.

Examples of the organic resin-based hard coating agent include melamine resins, urethane resins, alkyd resins, acrylic resins and polyfunctional acrylic resins. The polyfunctional acrylic resins include polyol acrylate, polyester acrylate, urethane acrylate, epoxy acrylate and phosphagen acrylate.

Further, the resin forming the hard coat layer may contain additives such as an optical stabilizer, ultraviolet absorbent, catalyst, thermal/photopolymerization initiator, polymerization inhibitor, defoaming agent, leveling agent, thickener, precipitation inhibitor, dripping inhibitor, flame retardant, organic/inorganic pigment/dye, and addition aid.

Coating techniques include bar coating, dip coating, flow coating, spray coating, spin coating and roller coating, all of which are suitably selected according to the shape of a molded body which is a base material to be coated.

The thickness of the hard coat layer is preferably 2 to 30 µm, more preferably 3 to 20 µm and much more preferably 4 to 10 µm. Above the lower limit, the abrasion resistance of the base material is obtained and above the upper limit, curing unevenness hardly occurs and thereby adhesion between the hard coat layer and the base material is satisfactory.

The surface of the hard coat layer is preferably hydrophilized. The hydrophilizing method is not particularly limited but cerium oxide polishing, corona discharge treatment, burner treatment, atmospheric plasma treatment and vacuum ultraviolet exposure treatment may be employed. By treating the surface of the hard coat layer by any one of the above methods, the water contact angle of the hard coat layer is preferably set to 30° or less. The water contact angle is preferably 20° or less, more preferably 10° or less. Below the upper limit, when the flaky metal oxide fine particles are hardened, excellent abrasion resistance and antifouling property are obtained.

Preferably, the hard coat layer contains colloidal silica or an alkoxysilane hydrolyzed condensate. Further, preferably, the hard coat layer is formed from (i) a hard coating agent containing colloidal silica and/or an alkoxysilane hydrolyzed condensate in an amount of not less than 30 wt % based on the total weight of the hard coating agent excluding a solvent and has (ii) a water contact angle of 30° or less.

<Top Coat Layer>

In the present invention, the top coat layer contains flaky metal oxide fine particles. In the present invention, the flaky metal oxide fine particles (may be referred to as "nanosheets" hereinafter) are sheet-like metal oxide fine particles having a thickness of only 10 nm and a high aspect ratio.

The thickness of each of the metal oxide fine particles is preferably 0.2 to 9 nm, more preferably 0.5 to 8 nm and much more preferably 1 to 8 nm. The size of the metal oxide fine particle is preferably 0.08 to 200 µm, more preferably 0.1 to 100 µm and much more preferably 0.1 to 80 µm. The shortest width/thickness ratio of the metal oxide fine particle is preferably not less than 10, more preferably 100 to 3,000,000 and much more preferably 100 to 100,000.

It is preferred from the viewpoint of obtaining excellent abrasion resistance that the flaky metal oxide fine particle contains at least one element selected from the group consisting of Ti, Nb, Al, Si, W, Fe, Mn, Cr, Ca and Mg as a constituent element. Further, to provide antifouling property, an element having photocatalyst performance is used as a constituent element. By using the flaky metal oxide fine particle containing the above constituent element, a valence band electron is excited in a conductance band by the absorption of energy (such as ultraviolet light) corresponding to a band gap, thereby producing a hole ($h^+$) which is an electron empty shell in the valence band and an electron ($e^-$) in the conductance band. The electron and the hole react with water or oxygen on the surface of titanium oxide to produce a radical having extremely strong oxidation power which decomposes almost all organic substances constituting stains and bacteria. A structural change occurs by the absorption of ultraviolet light, and the surface is highly hydrophilized, thereby making it easy to wash away stains with water. A surface from which stains can be easily removed is formed by the application of ultraviolet light due to this function. Ti and Nb are excellent in photocatalyst performance as constituent elements and make the surface super-hydrophilic and excellent in antifouling property advantageously.

When Ti is a constituent element, for example, flaky metal oxide fine particles obtained by the ion exchange and delamination of a layered titanate such as potassium titanate, potassium magnesium titanate or cesium titanate may be advantageously used. Further, since a nanosheet synthesized from cesium titanate ($Cs_{0.7}Ti_{1.825}\square_{0.175}O_4$, $\square$ signifies a hole) having a lepidocrocite type structure has a lamellar structure with a large aspect ratio and is excellent in dispersibility, it is particularly preferably used to form a high-quality coat film. When Nb is a constituent element, flaky metal oxide fine particles obtained by the ion exchange and delamination of a layered potassium niobate represented by $KNb_3O_8$ or $K_4Nb_6O_{17}$ may be advantageously used. Since especially a nanosheet represented by $[Nb_3O_8]^-$ has a highly symmetrical structure, is not rolled and has a stable sheet structure, it is particularly preferably used to obtain a high-quality coat film.

The thickness of the top coat layer is preferably 3 to 100 nm, more preferably 4 to 30 nm and much more preferably 5 to 20 nm.

The laminate of the present invention may be produced by forming a top coat layer through the step (ii) to the step (iv) which will be described hereinafter on a substrate for forming a top coat layer, in which the base layer and the hard coat layer are formed in the mentioned order. The top coat layer is preferably formed by at least one method selected from the group consisting of ionizing material exposure, ionizing radiation exposure, infrared exposure, microwave exposure and high-temperature vapor exposure. The laminate of the present invention is preferably a window member, especially a window member for vehicles.

[Method of Forming a Top Coat Layer]

The present invention includes a method of forming a top coat layer containing flaky metal oxide fine particles on a substrate, comprising the steps of:

(step-i) preparing a substrate;

(step-ii) applying a dispersion of flaky metal oxide fine particles to the substrate to form a coating layer;

(step-iii) drying the coating layer to form a dry layer; and (step-iv) hardening the flaky metal oxide fine particles contained in the dry layer by at least one method selected from the group consisting of ionizing material exposure, ionizing radiation exposure, infrared exposure, microwave exposure and high-temperature vapor exposure.

<(Step-i) Step of Preparing a Substrate>

The step-i is the step of preparing a substrate. In the method of forming a top coat layer according to the present invention, the substrate is preferably made of at least one selected from the group consisting of glass, metals, ceramics and plastics.

The plastic is not particularly limited and examples thereof include polyolefin resins such as polyethylene and polypropylene, amorphous polyolefin resins such as polydicyclopentadiene, polycarbonate resins, acrylic resins such as polymethyl methacrylate, polyester resins such as polyethylene terephthalate, polybutylene terephthalate and poly(ethylene-2,6-naphthalate), polystyrene resins, polyarylate resins, polyether sulfone resins, polyether ether keton resins, polyimide resins, phenolic resins and urea resins. Out of these, polycarbonate resins, acrylic resins such as polymethyl methacrylate, polyester resins such as polyethylene terephthalate, polybutylene terephthalate and poly(ethylene-2,6-naphthalate), polystyrene resins, polypropylene resins, polyarylate resins and polyether sulfone resins all of which have excellent transparency are preferred. Polycarbonate resins having high impact strength are more preferred.

The thickness of the substrate is not particularly limited but preferably 0.05 to 20 mm, more preferably 1 to 10 mm.

The substrate is preferably a laminate comprising a base layer and a hard coat layer all of which are formed in the mentioned order. The base layer is preferably made of a plastic.

Although the hard coating agent used in the hard coat layer is not particularly limited, a silicone resin-based hard coating agent or an organic resin-based hard coating agent is used. When a hard coating agent containing colloidal silica or an alkoxysilane hydrolyzed condensate out of these is used to form a hard coat layer and a top coat layer is formed on the surface of the hard coat layer by using flaky metal oxide fine particles, particularly excellent abrasion resistance is obtained advantageously. The silicone resin-based hard coating agent is selected from among a two-coat type consisting of a primer layer and a top layer and a one-coat type consisting of only one layer. The thickness of the hard coat layer is preferably 2 to 30 μm, more preferably 3 to 20 μm and much more preferably 4 to 10 μm. Above the lower limit, the abrasion resistance of the base material is obtained and below the upper limit, curing unevenness hardly occurs and adhesion between the hard coat layer and the base material becomes satisfactory.

The surface of the hard coat layer is generally water-repellent and often repels a nanosheet dispersion as it is. Therefore, it is preferred that, after the surface of the hard coat layer is hydrophilized, the nanosheet dispersion should be applied. Examples of the method of hydrophilizing the surface of the hard coat layer include cerium oxide polishing, corona discharge treatment, burner treatment, atmospheric plasma treatment and vacuum ultraviolet exposure treatment. By treating the surface of the hard coat layer by any one of the above methods, the top coat layer can be coated to a uniform thickness. The deposition direction of the top coat layer is preferably controlled by controlling hydrophilic nature.

The hard coat layer preferably contains colloidal silica or an alkoxysilane hydrolyzed condensate. Preferably, the hard coat layer is formed from (I) a hard coating agent containing colloidal silica and/or an alkoxysilane hydrolyzed condensate in an amount of not less than 30 wt % based on the total weight of the hard coating agent excluding a solvent and has (II) a water contact angle of 30° or less.

<(Step-ii) Coating Step>

The step-ii is the step of applying a dispersion of flaky metal oxide fine particles to the substrate to form a coating layer.

The flaky metal oxide fine particles (may be referred to as "nanosheets" hereinafter) are sheet-like metal oxide fine particles having a thickness of only 10 nm and a high aspect ratio.

The nanosheet dispersion is prepared by dispersing a sheet-like substance having a shortest width of not less than 10 nm, a thickness of not more than 10 nm and a shortest width/thickness ratio of not less than 10 in a solvent in accordance with a method in which a mineral crystal is treated with a delamination substance and a dispersant.

The solvent in use is not particularly limited but preferably water, an alcohol such as methanol, ethanol, 2-propanol or 2-methyl-1-propanol, ketone such as acetone, 2-butanone or 4-methyl-2-pentanone, ether such as diethyl ether, tetrahydrofuran or dioxolan, ether alcohol such as 2-ethoxyethanol or 1-methoxy-2-propanol, dimethylformamide or dimethyl sulfoxide. Water is particularly preferably used. These solvents may be used alone or in combination of two or more.

The total concentration of the nanosheets in the nanosheet dispersion is preferably 0.01 to 10 wt %, more preferably 0.1 to 2 wt %. The nanosheets can be coated with no space therebetween by using a dispersion having a concentration above the lower limit (though this depends on the surface state of the substrate and the coating technique), and a nanosheet layer having an appropriate thickness can be obtained by using a dispersion having a concentration below the upper limit.

The nanosheet dispersion can be obtained by adding a delamination/dispersion stabilizer such as an amine to a mineral in the form of a lamellar crystal such as mica and stirring them. The delamination/dispersion stabilizer is coordinated to both sides of the nanosheets to prevent the nanosheets from bonding together again.

The nanosheet layer formed by applying the above dispersion and drying it is in such a state that the amine used for delamination and dispersion stabilization remains between the nanosheets. Energy is applied to the nanosheets to remove a substance between the nanosheets, secure adhesion between the nanosheets and between the nanosheets and the substrate and also carry out the phase transition of the nanosheet crystal phase, thereby securing a required function.

The method of coating the nanosheet dispersion is not particularly limited and suitably selected from bar coating, dip coating, flow coating, spray coating, spin coating and roller coating according to the shape of the substrate to be coated.

<(Step-iii) Drying Step>

The step-iii is the step of drying the coating layer to form a dry layer. Although drying is not particularly limited, it is carried out by heating at a temperature from normal temperature to the thermal deformation temperature of the substrate.

<(Step-iv) Hardening Step>

The step-iv is the step of hardening the flaky metal oxide fine particles contained in the dry layer to form a hardened layer. Hardening is carried out by at least one method selected from the group consisting of ionizing material exposure, ionizing radiation exposure, infrared exposure, microwave exposure and high-temperature vapor exposure.

(Hardening by Ionizing Material Exposure)

The ionizing material radiation is a generic term for the radiations of ionizing materials such as plasma, ions and electrons. Since the ionizing material has charge, its state can be controlled in an electric field, thereby making it possible to apply high energy locally advantageously. Plasma (state) refers to a state where a substance is separated into an ion and an electron all of which move freely, or to a free electron and a free ion in this state. The plasma state is generally formed at a high temperature or in a discharge environment by carrying out glow discharge under vacuum, Townsend discharge, discharge with a high-frequency power source at an atmospheric pressure, or arc discharge at a high temperature. Low-temperature plasma formed by glow discharge under vacuum or Townsend discharge is characterized by a huge difference between the temperature of a carrier gas ion and the temperature of an electron and is particularly preferred because high energy can be applied to the surface while a rise in the temperature of the substrate is suppressed.

The type of the plasma forming gas is not particularly limited and examples thereof include rare gases such as helium, neon, argon and xenon, hydrogen, nitrogen, oxygen and carbon dioxide, out of which rare gases such as helium, neon, argon and xenon, and oxygen are preferred because they can maintain the performance of the nanosheet.

Plasma formation is carried out at a pressure of preferably 0.001 to 1,000 Pa, more preferably 0.01 to 20 Pa, much more preferably 0.01 to 10 Pa and particularly preferably 0.1 to 5 Pa. Above the lower limit, a plasma discharge state can be formed stably advantageously and below the upper limit, the content of plasma particles having energy required for the hardening of the nanosheet becomes high advantageously. The plasma forming gas is introduced into the apparatus at a flow rate of generally 0.01 to 3 sccm per 1 $cm^2$ of the electrode to achieve the above pressure though the above flow rate cannot be specified unconditionally because it depends on the size of the apparatus and the capacity of a vacuum pump in use.

Glow discharge which is generally carried out to form the plasma state is preferred because discharge can be carried out stably at 0.4 to 10 Pa, and the discharge state is stably maintained at 0.001 to 1,000 Pa by devising the apparatus. Both the gas pressure and the input power which are connected with the plasma state greatly affect the amount of each free electron and the motion energy of each free electron, the gas pressure greatly affects the number of free electrons, and the input power greatly affects the amount of energy of all free electrons. In the case of the same input power, as the gas pressure becomes lower, the number of free electrons becomes smaller and the energy of each free electron becomes larger.

When plasma is applied to the nanosheet, free electrons collide with the nanosheet to harden it and their energy is transmitted to the substrate to cause a rise in the temperature of the substrate. The larger energy of each free electron is more advantageous for the hardening of the nanosheet, and the smaller total energy of free electrons is more advantageous for the suppression of a rise in the temperature of the substrate.

At a gas pressure of not more than 5 Pa and an input power of not less than 0.4 $W/cm^2$, the kinetic energy of each free electron becomes preferred for the hardening of the nanosheet, and at a input power of not more than 5 $W/cm^2$, a rise in the temperature of the substrate can be suppressed advantageously. At a gas pressure of 0.4 to 5 Pa, glow discharge can be carried out with an input power of 0.1 to 5 $W/cm^2$. Within the above gas pressure range and the above input power range, the hardening of the nanosheet can be carried out efficiently while a rise in the temperature of the substrate is suppressed advantageously.

As the plasma application time becomes longer, the hardening of the nanosheet proceeds more. However, since the temperature of the substrate continues to rise during plasma application, the plasma application time must beset to a range which the heat resistance of the substrate permits. When the plasma application possible time which depends on the gas pressure and the input power is 5 to 10 minutes in the case of a gas pressure of 0.5 Pa and an input power of 1 $W/cm^2$, the hardening of the nanosheet can be carried out efficiently while a rise in the temperature of the substrate is suppressed advantageously.

(Hardening by Ionizing Radiation Exposure)

The ionizing radiation is radiation which flicks an electron out from a substance when it collides with the substance to produce a secondary electron and a secondary ion. Examples of the ionizing radiation include ultraviolet radiation, X-ray, γ-ray, neutron radiation, electron beam and ion line. It is understood from the fact that this flicks an electron out from a substance that it has huge energy with which the removal of an interlayer ligand and the phase transition of the nanosheet can be carried out by a function different from thermal oscillation. Therefore, the nanosheet can be hardened while a rise in the temperature of the substrate is suppressed advantageously.

(Hardening by Infrared Exposure)

Hardening by infrared exposure is preferred because the nanosheet is heated locally in a short period of time by applying oscillation energy in the form of an electromagnetic wave, thereby making it possible to harden the nanosheet while a rise in the temperature of the substrate is suppressed advantageously. When a laser beam is used, it is possible to reduce the beam diameter than that of an ordinary infrared lamp.

(Hardening by Microwave Exposure)

Microwave exposure is preferred since the nanosheet can be heated by oscillating the nanosheet itself with resonance with a microwave without transmitting heat to the substrate, thereby making it possible to harden the nanosheet while a rise in the temperature of the substrate is suppressed.

(Hardening by High-temperature Vapor Exposure)

Hardening by high-temperature vapor exposure is preferred because heating occurs only in a portion which high-temperature water molecules collide with by spraying the water molecules, thereby making it possible to suppress a rise in the temperature of the whole substrate. Also, an effect that the water molecules become a catalyst for the removal of an amine-based ligand and phase transition is obtained advantageously.

Out of these hardening methods, ionizing material exposure is preferred from the viewpoint of the suppression of a rise in the temperature of the substrate, and plasma exposure is particularly preferred.

Meanwhile, the thickness of the top coat layer is preferably 3 to 100 nm, more preferably 4 to 30 nm and particularly preferably 5 to 20 nm after hardening. When the thickness of the top coat layer is larger than the lower limit, abrasion resistance becomes excellent and when the thickness is smaller than the upper limit, the top coat layer can be fully fixed advantageously.

{Substrate for Forming a Top Coat Layer}

The present invention includes a substrate for forming a top coat layer containing flaky metal oxide fine particles, comprising a base layer and a hydrophilized hard coat layer all of which are formed in the mentioned order, wherein the hard coat layer is formed from (i) a hard coating agent comprising colloidal silica and/or an alkoxysilane hydrolyzed condensate in an amount of not less than 30 wt % based on the total weight of the hard coating agent excluding a solvent and has (ii) a water contact angle of 30° or less.

The base layer is as described above. The surface of the hard coat layer is generally water-repellent and often repels a nanosheet dispersion as it is. Therefore, it is preferred that, after the surface of the hard coat layer is hydrophilized, the nanosheet dispersion should be applied. Examples of the method of hydrophilizing the surface of the hard coat layer include cerium oxide polishing, corona discharge treatment, burner treatment, atmospheric plasma treatment and vacuum ultraviolet exposure treatment. By treating the surface of the hard coat layer by any one of the above methods, the top coat layer can be coated to a uniform thickness. The deposition direction of the top coat layer is preferably controlled by controlling hydrophilic nature.

As for the hard coating agent, the amount of the colloidal silica and/or alkoxysilane hydrolyzed condensate is preferably not less than 50 wt %, more preferably 70 wt %. Above the lower limit, when flaky metal oxide fine particles containing an element having metal catalyst performance as a constituent element are hardened on the hard coat layer, excellent antifouling property and abrasion resistance are obtained advantageously.

EXAMPLES

The following examples are provided for the purpose of further illustrating the present invention but are in no way to be taken as limiting as long as they do not depart from the scope and spirit of the present invention. Evaluations in the examples and comparative examples were made by the following methods.

<Evaluation of Hard Coat Layer>

(1) Measurement of Water Contact Angle

The water contact angle of the hard coat layer whose surface had been hydrophilized was measured with a contact angle meter (Drop Master M-301 of Kyowa Interface Science Co., Ltd.).

<Evaluation of Flaky Metal Oxide Fine Particles after Hardening>

(1) Appearance

The appearance (existence of foreign matter) and cracking of the coat layer of a test specimen and the state of the base layer were checked visually. ◯ indicates that the appearance is good and X indicates that the appearance is poor.

(2) Adhesion

The coat layer was cut into 100 squares with a cutter knife at intervals of 1 mm, and the adhesive tape (trade name of "CELLOTAPE" (registered trademark)) of Nichiban Co., Ltd. was pressure bonded to the coat layer and strongly removed vertically to count the number of squares remaining on the substrate (based on JIS K5600-5-6).

(3) Pencil Hardness

A pencil was set on the test specimen at an angle of 45° and a load of 750 g was applied to the pencil to check the appearance whether the test specimen was scratched or not. The highest hardness of the pencil which was not scratched was taken as the pencil hardness of the test specimen (based on JIS K5600-5-4).

(4) Steel Wool Hardness (SW)

Steel wool having a roughness of #0000 was affixed to a circular jig having a diameter of 1 mm and reciprocated a width of 5 cm 20 times under a load of 1 kg to check the scratching of the test specimen based on the following criteria.

5: no scratch
4: 1 to 5 scratches having a length of not more than 3 mm
3: 6 to 20 scratches having a length of not more than 3 mm
2: 20 to 50 scratched
1: not less than 50 scratches (5) Abrasion Resistance The CS-10F abrasive wheels of Calibrase Co., Ltd. were used to make a 1,000-rotation Taber abrasion test under a load of 500 g so as to measure the difference $\Delta Ht$ between haze after the Taber abrasion test and haze before the Taber abrasion test (based on ASTM D1044)

(haze=Td/Tt×100, Td: scattered light transmittance, Tt: total light transmittance)

(6) Measurement of Water Contact Angle after Light Exposure

After 1 $mW/cm^2$ ultraviolet light was applied to the test specimen for 1 hour, the contact angle of a water droplet was measured by using a contact angle meter (Drop Master M-301 of Kyowa Interface Science Co., Ltd.).

<I. Preparation of Samples Used for Hard Coat Layer>

Reference Example 1

Preparation of Acrylic Primer Coating Agent (A-1)

79.9 parts of ethyl methacrylate (to be abbreviated as EMA hereinafter), 33.6 parts of cyclohexyl methacrylate (to be abbreviated as CHMA hereinafter), 13.0 parts of 2-hydroxyethyl methacrylate (to be abbreviated as HEMA hereinafter), 126.6 parts of methyl isobutyl ketone (to be abbreviated as MIBK hereinafter) and 63.3 parts of 2-butanol (to be abbreviated as 2-BuOH hereinafter) were added to a flask equipped with a reflux condenser and a stirrer whose inside had been substituted by nitrogen to be mixed together. After a nitrogen gas was let pass through the mixture for 15 minutes to remove oxygen, the temperature was raised to 70° C. in a nitrogen gas stream, and 0.33 part of azobisisobutyronitrile (to be abbreviated as AIBN hereinafter) was added to carry out a reaction in a nitrogen gas stream at 70° C. for 5 hours under agitation. 0.08 part of AIBN was further added, and the temperature was raised to 80° C. to carryout the reaction for 3 hours so as to obtain an acrylic copolymer solution (A) having a nonvolatile matter content of 39.6%. The weight average molecular weight of the acrylic copolymer was 125,000 in terms of polystyrene when measured by GPC (column; Shodex GPCA-804, eluent; THF).

43.2 parts of methyl isobutyl ketone, 21.6 parts of 2-butanol and 83.5 parts of 1-methoxy-2-propanol were added to and mixed with 100 parts of the obtained acrylic copolymer solution (A), 5.3 parts of Tinubin 400 (triazine-based ultraviolet absorbent of BASF Japan Ltd.) and 10.6 parts of VESTANATB1358/100 (polyisocyanate compound precursor of Degsa Japan) were added to ensure that the amount of the isocyanate group became 1.0 equivalent based on 1 equivalent of the hydroxyl group of the acrylic copolymer contained in the acrylic resin solution (A), and further 0.015 part of tin dimethyldineodecanoate was added and stirred at 25° C. for 1 hour to obtain an acrylic primer coating agent (A-1).

Reference Example 2

Preparation of Silicone Resin-based Hard Coating Agent (I-1)

1.3 parts of 1M hydrochloric acid was added to 133 parts of a water-dispersible colloidal silica dispersion (Cataloid SN-35 of Catalysts & Chemicals Industries Co., Ltd., solid content of 30 wt %) and stirred well. This dispersion was cooled to 10° C., and 162 parts of methyl trimethoxysilane was added dropwise to this dispersion under cooling in an iced water bath. Right after the addition of methyl trimethoxysilane, the temperature of the mixed solution began to rise by reaction heat and reached 60° C. in 5 minutes after the start of addition, and the temperature of the mixed solution gradually dropped by a cooling effect. When the temperature of the mixed solution became 30° C., the mixed solution was stirred at 30° C. for 10 hours to keep this temperature, 0.8 part of a choline methanol solution containing 45 wt % of choline as a curing catalyst, 5 parts of acetic acid as a pH control agent and 200 parts of 2-propanol as a diluting solvent were mixed with this mixed solution to obtain a silicone resin-based hard coating agent (I-1).

Reference Example 3

Preparation of Ultraviolet Curable Acrylate Hard Coating Agent (I-2)

100 parts of a polyfunctional acrylate oligomer (U-15HA of Shin Nakamura Chemical Co., Ltd.), 7 parts of phenyl-1-hydroxycyclohexyl ketone (Irgacure184 of BASF Japan Ltd.), 250 parts of 1-methoxy-2-propanol, 100 parts of 2-propanol and 50 parts of organic solvent dispersible colloidal silica (IPA-ST of Nissan Chemical Industries, Ltd., solid content of 30%) were mixed together to obtain an ultraviolet curable acrylate hard coating agent (I-2).

Reference Example 4

Preparation of Melamine Resin Hard Coating Agent (I-3)

100 parts of hexamethoxymethylol melamine (Simel 350 of Mitsui Chemical Co., Ltd.), 25 parts of polyethylene glycol (molecular weight of 200), 45 parts of 1,4-butanediol, 118 parts of isopropyl alcohol, 244 parts of isobutanol, 7 parts of maleic acid and 6 parts of 2,4-dihydroxybenzophenone were mixed together to obtain a melamine resin hard coating agent (I-3).

Reference Example 8

Preparation of Ultraviolet Curable Acrylate Hard Coating Agent (I-4)

100 parts of a polyfunctional acrylate oligomer (U-15HA of Shin Nakamura Chemical Co., Ltd.), 5 parts of phenyl-1-hydroxycyclohexyl ketone (Irgacure184 of BASF Japan Ltd.), 250 parts of 1-methoxy-2-propanol, 100 parts of 2-propanol and 150 parts of organic solvent dispersible colloidal silica (IPA-ST of Nissan Chemical Industries, Ltd, solid content of 30%) were mixed together to obtain an ultraviolet curable acrylate hard coating agent (I-4).

<II. Preparation of Samples Used for Top Coat Layer>

Reference Example 5

Preparation of Titania Nanosheet Coating Agent (II-1)

Cesium carbonate and titanium oxide were mixed together in a molar ratio of 1:5.3, and the resulting mixture was baked at 800° C. for 20 hours twice. The stirring in diluted hydrochloric acid, filtration and drying of the formed cesium titanate were repeated 4 times to obtain lamellar titanic acid having a hydrogen ion substituted for a cesium ion. An aqueous solution of tetrabutylammonium hydroxide was added as a delamination agent to this and stirred for 14 days, and the resulting product was diluted with pure water to obtain a titania nanosheet water dispersion having a solid content of 3 wt %. The obtained titania nanosheet water dispersion was diluted with ethanol to obtain a titania nanosheet coating agent having a solid content of 0.3 wt % (II-1).

The coating agent (II-1) was further diluted with ethanol to a concentration of 0.01 wt % and applied to a quartz glass sheet at a pull-up rate of 3 cm/sec by a dip coating method.

When the surface of the obtained test specimen was observed through an atomic force microscope to measure the size and thickness of the test specimen, the obtained nanosheet had a size of 10 to 50 μm in a plane direction and a thickness of 2 to 5 nm.

Reference Example 6

Preparation of Niobia Nanosheet Coating Agent (II-2)

Potassium nitrate and niobium oxide were mixed together in a molar ratio of 1:3 (K:Nb) and preliminarily baked at 600° C. for 2 hours. The obtained powders were milled, mixed together, baked again at 900° C. for 20 hours and slowly cooled to obtain potassium niobate ($KNb_3O_8$). The formed potassium niobate was suspended and stirred in 1M nitric acid to carry out ion exchange for 24 hours, the supernatant was removed by centrifugation, and the obtained product was washed with pure water. This series of ion exchange treatment was repeated 4 times to obtain lamellar niobic acid having a hydrogen ion substituted for a potassium ion. After a 3-methoxypropylamine aqueous solution was added as a delamination agent to this and stirred for 14 days, the resulting solution was diluted with pure water to prepare a niobia nanosheet water dispersion having a solid content of 3 wt %. The obtained niobia nanosheet water dispersion was diluted with ethanol to obtain a niobia nanosheet coating agent having a solid content of 1 wt % (II-2).

The coating agent (II-2) was further diluted with ethanol to a concentration of 0.01 wt % and applied to a quartz glass sheet at a pull-up rate of 3 cm/sec by the dip coating method.

When the surface of the obtained test specimen was observed through an atomic force microscope to measure its size and thickness, the obtained nanosheet had a size of 20 to 50% μm in a planar direction and a thickness of 3 to 8 nm.

Reference Example 7

Preparation of Mica Nanosheet Coating Agent (II-3)

Potassium carbonate, silicon oxide, aluminum oxide and magnesium oxide were mixed together in a molar ratio of 1:4:3:3 and baked at 800° C. for 20 hours. The stirring in diluted hydrochloride acid, filtration and drying of the formed mica were repeated 4 times, and excess potassium oxide was washed away so as to obtain a mica mixture having a hydrogen ion substituted for a potassium ion. An aqueous solution of tetrabutylammonium hydrochloride was added as a delamination agent to this, stirred for 14 days and diluted with pure water to obtain a mica nanosheet water dispersion having a solid content of 6 wt %. The obtained mica nanosheet water dispersion was diluted with 2-propanol to obtain a mica nanosheet coating agent having a solid content of 0.5 wt % (II-3).

The coating agent (II-3) was further diluted with ethanol to a concentration of 0.01 wt % and applied to a quartz glass sheet at a pull-up rate of 3 cm/sec by the dip coating method.

When the surface of the obtained test specimen was observed through an atomic force microscope to measure its size and thickness, the obtained nanosheet had a size of 20 to 80 μm in a planar direction and a thickness of 1 to 4 nm.

Example 1

The acrylic primer coating agent (A-1) obtained in Reference Example 1 was applied to both sides of a polycarbonate resin (to be referred to as "PC resin" hereinafter) sheet (PC-1111 sheet of Teijin Chemicals Ltd., 150×150×5 mm) to a film thickness of 5.0 μm after thermal curing by the dip coating method, left at 25° C. for 20 minutes and thermally cured at 130° C. for 1 hour.

Thereafter, the silicone resin-based hard coating agent (I-1) obtained in Reference Example 2 was applied to the coated surface of the molded sheet to a film thickness of 4.0 μm after thermal curing by the dip coating method, left at 25° C. for 20 minutes and thermally cured at 120° C. for 1 hour. The surface of the coated sheet was exposed to light (40 nW/cm$^2$) from a xenon excimer lamp at a distance of 0.5 mm from the lamp for 1 minute to be hydrophilized.

Thereafter, the titania nanosheet coating agent (II-1) obtained in Reference Example 5 was applied to a thickness of 20 nm after hardening by the dip coating method and left to be dried at 25° C. for 5 minutes, and plasma was generated by using an argon gas as a plasma carrier gas at a process vacuum degree of 0.5 Pa, an RF power at 13.56 MHz of 3,600 W and an electrode area of 3,600 cm$^2$ by means of a volume bonded internal electrode type plasma generator and applied to the surface of the coated molded sheet for 7 minutes to harden it so as to obtain a polycarbonate resin laminate. When the temperature of the substrate after the end of hardening was measured by means of a thermocouple attached to the surface of the substrate, it was 130° C. The evaluation results of the obtained laminate are shown in Table 1.

Example 2

A polycarbonate resin laminate was obtained in the same manner as in Example 1 except that the niobia nanosheet coating agent (II-2) obtained in Reference Example 6 was applied to a film thickness of 15 nm after hardening by the dip coating method. The evaluation results of the obtained laminate are shown in Table 1.

Example 3

A polycarbonate resin laminate was obtained in the same manner as in Example 2 except that plasma was applied for 9 minutes. The evaluation results of the obtained laminate are shown in Table 1.

Example 4

A polycarbonate resin laminate was obtained in the same manner as in Example 2 except that the nanosheet coating agent was applied to a film thickness of 5 nm after hardening, and plasma was generated by using an argon gas as a plasma carrier gas at a process vacuum degree of 1.1 Pa, an RF power at 13.56 MHz of 3,600 W and an electrode area of 3,600 cm$^2$ and applied to the surface of the coated molded sheet for 7 minutes to harden it. The evaluation results of the obtained laminate are shown in Table 1.

Example 5

A PC resin laminate was obtained in the same manner as in Example 2 except that the ultraviolet curable acrylate hard coating agent (I-2) obtained in Reference Example 3 was applied to both sides of a PC resin sheet (150×150×5 mm) to a film thickness of 5.0 μm after curing by the dip coating method, left at 25° C. for 1 minute and at 80° C. for 1 minute and exposed to ultraviolet light from a high-pressure mer-

Example 6

A 0.2% 2-aminoethanol methanol solution was poured onto a PC resin sheet (150×150×5 mm) and dried to remove stains on the surface, and a functional group was exposed to the surface. A PC resin laminate was obtained in the same manner as in Example 2 except that the melamine resin hard coating agent (I-3) obtained in Reference Example 4 was applied to both sides of the sheet to a film thickness of 5.0 μm after curing and left at 25° C. for 20 minutes and thermally cured 120° C. for 1 hour. The evaluation results of the obtained laminate are shown in Table 1.

Example 7

A polycarbonate laminate was obtained in the same manner as in Example 1 except that the mica nanosheet coating agent (II-3) obtained in Reference Example 7 was applied to a thickness of 10 nm after hardening by the dip coating method. The evaluation results of the obtained laminate are shown in Table 1.

Example 8

A silicone resin hard-coated PC sheet was produced in the same manner as in Example 1, and the surface of the coated sheet was exposed to a butane gas burner for 2 seconds to be hydrophilized.

Thereafter, the niobia nanosheet coating agent (II-2) obtained in Reference Example 6 was applied to a film thickness of 15 nm after fixing by the dip coating method, left at 25° C. for 5 minutes and let pass through a condenser lamp house having two 1000 W halogen infrared lamps four times at a rate of 5 m/min to harden the nanosheet so as to obtain a PC resin laminate.

The evaluation results of the obtained laminate are shown in Table 1. In the condenser lamp house, light could be concentrated to a width of 5 cm by the visual evaluation of the boundary between a bright portion and a dark portion. Since the sample was let pass through the lamp house at a rate of 5 m/min, it passed through a high temperature portion where infrared light was concentrated in 0.6 second. At this light concentration point (line) of this infrared light, the temperature of the standing sample went up to 1,000° C. in the end.

Example 9

A PC resin laminate was obtained in the same manner as in Example 1 except that the titania nanosheet coating agent (II-1) was applied to a film thickness of 20 nm after fixing by the dip coating method. The evaluation results of the obtained laminate are shown in Table 1.

Example 10

A silicon resin hard-coated PC sheet was produced in the same manner as in Example 1, and the surface of the coated sheet was exposed to light (40 nW/cm$^2$) from a xenon excimer lamp at a distance of 0.5 mm from the lamp for 30 seconds to be hydrophilized.

Thereafter, the tiania nanosheet coating agent (II-1) was applied to a film thickness of 20 nm after fixing by the dip coating method, left to be dried at 25° C. for 5 minutes and exposed to 10 nW/cm$^2$ ultraviolet light under vacuum for 10 minutes using an ArF excimer lamp to be fixed so as to obtain a PC resin laminate. The evaluation results of the obtained laminate are shown in Table 1.

Example 11

A plastic laminate was obtained in the same manner as in Example 6 except that the PC resin sheet (150×150×5 mm) of Example 6 was changed to a polymethyl methacrylate resin (PMMA, DIALITE L of Mitsubishi Rayon Co., Ltd.) sheet (150×150×2 mm). The evaluation results of the obtained laminate are shown in Table 1.

Example 12

A plastic laminate was obtained in the same manner as in Example 6 except that the PC resin sheet (150×150×5 mm) of Example 6 was changed to a polyethylene resin (PE) sheet (150×150×1 mm). The evaluation results of the obtained laminate are shown in Table 1. Since the polyethylene resin was opaque, a Taber abrasion test was not made but it was confirmed from the evaluation of steel wool hardness that the laminate had excellent abrasion resistance.

Example 13

A plastic laminate was obtained in the same manner as in Example 3 except that the PC resin sheet (150×150×5 mm) of Example 3 was changed to a polyether sulfone resin (PES, SUMIKAEXCEL of Sumitomo Chemical Co., Ltd.) sheet (150×150×1 mm). The evaluation results of the obtained laminate are shown in Table 1.

Example 14

The niobia nanosheet coating agent (II-2) obtained in Reference 6 was applied to a glass sheet (150×150×3 mm) to a film thickness of 15 nm after hardening by the dip coating method, and a glass laminate was obtained under the same plasma application conditions as in Example 1. The evaluation results of the obtained laminate are shown in Table 1. Since the glass sheet could not be scratched in a grid with a cuter knife, an adhesion test was not made.

Example 15

After a copper sheet (150×150×3 mm) was washed with 0.1 M oxalic acid and then with pure water, the niobia nanosheet coating agent (II-2) obtained in Reference Example 6 was applied to a film thickness of 15 nm after hardening by the dip coating method, and a copper laminate was obtained under the same plasma application conditions as in Example 1. The measurement result of the steel wool hardness (SW) of the obtained copper laminate is shown in Table 1. After the obtained copper laminate was left in a 60° C. 95% RH environment for 2 weeks, it was taken out to observe its appearance. It retained its original metallic luster and no change in appearance was seen.

Example 16

After a copper sheet (150×150×3 mm) was washed with 0.1 M oxalic acid and then with pure water, the niobia nanosheet coating agent (II-2) obtained in Reference Example 6 was applied to a film thickness of 20 nm after hardening by the dip coating method, and plasma was generated by using an argon gas as a plasma carrier gas at a process vacuum degree of 0.5 Pa, an RF power at 13.56 MHz of 1,800 W and an electrode area of 3,600 cm² and applied to the surface of the coated stainless sheet for 20 minutes to harden it so as to obtain a copper laminate. The measurement result of the steel wool hardness of the obtained copper laminate is shown in Table 1. After the obtained copper laminate was left in a 60° C. 95% RH environment for 2 weeks, it was taken out to observe its appearance. It retained its original metallic luster and no change in appearance was seen.

Examples 17 to 24

PC resin laminates were obtained in the same manner as in Example 1 except that plasma was applied under the conditions shown in Table 1. The evaluation results of the obtained laminates are shown in Table 1.

Comparative Example 1

The evaluation results of a PC resin sheet (150×150×5 mm) are shown in Table 1.

Comparative Example 2

The acrylic primer coating agent (A-1) was applied to both sides of a PC resin sheet (150×150×5 mm) to a film thickness of 5.0 μm after thermal curing by the dip coating method, left at 25° C. for 20 minutes and thermally cured at 130° C. for 1 hour. Then, the silicone resin-based hard coating agent (I-1) obtained in Reference Example 2 was applied to the coated surface of the molded sheet to a film thickness of 4.0 μm after thermal curing by the dip coating method, left at 25° C. for 20 minutes and then thermally cured at 120° C. for 1 hour to obtain a PC resin laminate. The evaluation results of the obtained laminate are shown in Table 1.

Comparative Example 3

A copper sheet (150×150×3 mm) was washed with 0.1 M oxalic acid and then with pure water to remove impurities on the surface. The measurement result of its steel wool hardness is shown in Table 1. After the obtained copper sheet was left in a 60° C. 95% RH environment for 2 weeks, it was taken out to observe its appearance. Due to the progress of corrosion, the sheet lost its metallic luster and changed its color to Montpellier green.

Example 25

A polycarbonate resin laminate was obtained in the same manner as in Example 2 except that plasma was generated by using an argon gas as a plasma carrier gas at a process vacuum degree of 3.5 Pa, an RF power at 13.56 MHz of 3,600 W and an electrode area of 3,600 cm² and applied to the surface of the coated molded sheet for 7 minutes to harden it. The evaluation results of the obtained laminate are shown in Table 1.

TABLE 1

| No. | Substrate layer | Hard coat layer Type | Top coat layer Type | Thickness/nm | Fixing method | Conditions | | | Substrate temperature |
|---|---|---|---|---|---|---|---|---|---|
| Ex. 1 | PC | (I-1) | (II-1) | 20 | Plasma exposure | 1 W/cm² | 0.5 Pa | 7 min. | 130 |
| Ex. 2 | PC | (I-1) | (II-2) | 15 | Plasma exposure | 1 W/cm² | 0.5 Pa | 7 min. | 130 |
| Ex. 3 | PC | (I-1) | (II-2) | 15 | Plasma exposure | 1 W/cm² | 0.5 Pa | 9 min. | 160 |
| Ex. 4 | PC | (I-1) | (II-2) | 5 | Plasma exposure | 1 W/cm² | 1.1 Pa | 7 min. | 130 |
| Ex. 5 | PC | (I-2) | (II-2) | 15 | Plasma exposure | 1 W/cm² | 0.5 Pa | 7 min. | 130 |
| Ex. 6 | PC | (I-3) | (II-2) | 15 | Plasma exposure | 1 W/cm² | 0.5 Pa | 7 min. | 130 |
| Ex. 7 | PC | (I-1) | (II-3) | 10 | Plasma exposure | 1 W/cm² | 0.5 Pa | 7 min. | 130 |
| Ex. 8 | PC | (I-1) | (II-2) | 15 | Infrared exposure | Correspond to 1000° C. | — | 5 m/min × 4 | 160 |
| Ex. 9 | PC | (I-1) | (II-1) | 20 | Infrared exposure | Correspond to 1000° C. | — | 5 m/min × 4 | 160 |
| Ex. 10 | PC | (I-1) | (II-1) | 20 | Vacuum ultra violet exposure | 10 mW/cm² | — | 10 min. | 60 |
| Ex. 11 | PMMA | (I-2) | (II-2) | 15 | Plasma exposure | 1 W/cm² | 0.5 Pa | 7 min. | 130 |
| Ex. 12 | PE | (I-2) | (II-2) | 15 | Plasma exposure | 1 W/cm² | 0.5 Pa | 7 min. | 130 |
| Ex. 13 | PES | (I-1) | (II-2) | 15 | Plasma exposure | 1 W/cm² | 0.5 Pa | 9 min. | 160 |
| Ex. 14 | Soda glass | — | (II-2) | 15 | Plasma exposure | 1 W/cm² | 0.5 Pa | 7 min. | 130 |
| Ex. 15 | Copper | — | (II-2) | 15 | Plasma exposure | 1 W/cm² | 0.5 Pa | 7 min. | 110 |
| Ex. 16 | Copper | — | (II-2) | 20 | Plasma exposure | 0.5 W/cm² | 0.5 Pa | 20 min. | 110 |
| Ex. 17 | PC | (I-1) | (II-1) | 20 | Plasma exposure | 1 W/cm² | 80 Pa | 10 min. | 160 |
| Ex. 18 | PC | (I-1) | (II-1) | 20 | Plasma exposure | 1 W/cm² | 0.01 Pa | 7 min. | 130 |
| Ex. 19 | PC | (I-1) | (II-1) | 20 | Plasma exposure | 1 W/cm² | 10 Pa | 10 min. | 160 |
| Ex. 20 | PC | (I-1) | (II-1) | 20 | Plasma exposure | 1 W/cm² | 20 Pa | 10 min. | 160 |
| Example 21 | PC | (I-1) | (II-1) | 20 | Plasma exposure | 0.5 W/cm² | 0.5 Pa | 20 min. | 130 |
| Example 22 | PC | (I-1) | (II-1) | 20 | Plasma exposure | 3 W/cm² | 0.5 Pa | 1 min. | 150 |
| Example 23 | PC | (I-1) | (II-1) | 20 | Plasma exposure | 1 W/cm² | 0.5 Pa | 3 min. | 100 |
| Example 24 | PC | (I-1) | (II-1) | 20 | Plasma exposure | 0.5 W/cm² | 0.5 Pa | 1 hour | 150 |
| Comparative Example 1 | PC | — | — | | | | | | |

TABLE 1-continued

| | | | | | | | | | |
|---|---|---|---|---|---|---|---|---|---|
| Comparative Example 2 | PC | (I-1) | | | — | | | | — |
| Comparative Example 3 | Copper | | | | — | | | | — |
| Example 25 | PC | (I-1) | (II-2) | 15 | Plasma exposure | 1 W/cm$^2$ | 3.5 Pa | 7 min. | 130 |

| No. | Appearance | Adhesion | Pencil hardness | SW | $\Delta$Ht (1000) | Water contact angle (°) |
|---|---|---|---|---|---|---|
| Example 1 | ○ | 100/100 | 2H | 5 | 0.9 | 30 |
| Example 2 | ○ | 100/100 | H | 4 | 0.9 | 40 |
| Example 3 | ○ | 100/100 | H | 5 | 0.7 | 50 |
| Example 4 | ○ | 100/100 | H | 4 | 1.6 | 60 |
| Example 5 | ○ | 100/100 | H | 4 | 1.4 | 60 |
| Example 6 | ○ | 100/100 | F | 4 | 1.2 | 60 |
| Example 7 | ○ | 100/100 | H | 4 | 1.2 | 70 |
| Example 8 | ○ | 100/100 | H | 4 | 2.5 | 40 |
| Example 9 | ○ | 100/100 | H | 4 | 2.2 | 60 |
| Example 10 | ○ | 100/100 | H | 3 | 2.8 | 50 |
| Example 11 | ○ | 100/100 | H | 4 | 1.4 | 60 |
| Example 12 | ○ | 100/100 | H | 4 | — | 60 |
| Example 13 | ○ | 100/100 | 2H | 4 | 1.0 | 40 |
| Example 14 | ○ | — | 9H | 5 | 0.8 | 40 |
| Example 15 | ○ | 100/100 | 9H | 4 | — | 60 |
| Example 16 | ○ | 100/100 | 9H | 3 | — | 50 |
| Example 17 | ○ | 100/100 | H | 4 | 2.8 | 60 |
| Example 18 | ○ | 100/100 | 2H | 4 | 1.1 | 50 |
| Example 19 | ○ | 100/100 | H | 4 | 1.6 | 60 |
| Example 20 | ○ | 100/100 | H | 4 | 2.2 | 60 |
| Example 21 | ○ | 100/100 | H | 4 | 2.5 | 60 |
| Example 22 | ○ | 100/100 | H | 4 | 1.4 | 60 |
| Example 23 | ○ | 100/100 | H | 4 | 2.3 | 40 |
| Example 24 | ○ | 100/100 | H | 4 | 2.5 | 50 |
| C. Ex. 1 | ○ | — | 2B | 1 | 44.0 | 80 |
| C. Ex. 2 | ○ | 100/100 | F | 3 | 3.8 | 90 |
| C. Ex. 3 | ○ | — | 9H | 1 | — | 70 |
| Example 25 | ○ | 100/100 | H | 3 | 2.8 | 60 |

Ex.: Example
C. Ex.: Comparative Example

Example 26

The acrylic primer coating agent (A-1) obtained in Reference Example 1 was applied to both sides of a polycarbonate resin (to be referred to as "PC resin" hereinafter) sheet (PC-1111 sheet of Teijin Chemicals Ltd, 150×150×5 mm) to a film thickness of 5.0 μm after thermal curing by the dip coating method, left at 25° C. for 20 minutes and thermally cured at 130° C. for 1 hour.

Then, the silicone resin-based hard coating agent (I-1) obtained in Reference Example 2 was applied to the coated surface of the molded sheet to a film thickness of 4.0 μm after thermal curing by the dip coating method, left at 25° C. for 20 minutes and thermally cured at 120° C. for 1 hour. The surface of the coated sheet was exposed to light (40 nW/cm$^2$) from a xenon excimer lamp at a distance of 0.5 mm from the lamp for 1 minute to be hydrophilized (VUV exposure).

After the niobia nanosheet coating agent (II-2) obtained in Reference Example 6 was applied to a film thickness of 15 nm after hardening by the dip coating method and left to be dried at 25° C. for 5 minutes, plasma was generated by using an argon gas as a plasma carrier gas at a process vacuum degree of 0.5 Pa, an RF power at 13.56 MHz of 3,600 W and an electrode area of 3,600 cm$^2$ by means of a volume bonded internal electrode type plasma generator and applied to the surface of the coated molded sheet for 7 minutes to harden it so as to obtain a polycarbonate resin laminate. When the temperature of the substrate at the end of hardening was measured by means of a thermocouple attached to the surface of the substrate, it was 130° C. The evaluation results of the obtained laminate are shown in Table 2.

Example 27

A polycarbonate resin laminate was obtained in the same manner as in Example 26 except that the application time of light (40 nW/cm$^2$) from the xenon excimer lamp was changed to 20 seconds. The evaluation results of the obtained laminate are shown in Table 2.

Example 28

A PC resin laminate was obtained in the same manner as in Example 26 except that the ultraviolet curable acrylate hard coating agent (I-2) obtained in Reference Example 3 was applied to both sides of a PC resin sheet (150×150×5 mm) to a film thickness of 5.0 μm after curing by the dip coating method, left at 25° C. for 1 minute and at 80° C. for 1 minute and cured by applying ultraviolet light from a high-pressure mercury lamp to an integral illuminance of 600 mJ/cm$^2$. The evaluation results of the obtained laminate are shown in Table 2.

Example 29

A plastic laminate was obtained in the same manner as in Example 26 except that a polyether sulfone resin (PES, SUMIKAEXCEL of Sumitomo Chemical Co., Ltd) sheet (150×150×1 mm) was used in place of the PC resin sheet (150×150×5 mm) of Example 26. The evaluation results of the obtained laminate are shown in Table 2.

Example 30

A PC resin laminate was obtained in the same manner as in Example 26 except that the ultraviolet curable acrylate hard coating agent (I-4) obtained in Reference Example 8 was applied to both sides of a PC resin sheet (150×150×5 mm) to a film thickness of 5.0 μm after curing by the dip coating method, left at 25° C. for 1 minute and at 80° C. for 1 minute and exposed to ultraviolet light from a high-pressure mercury lamp to an integral illuminance of 600 mJ/cm² to be cured. The evaluation results of the obtained laminate are shown in Table 2.

Example 31

The acrylic primer coating agent (A-1) obtained in Reference Example 1 was applied to both sides of a polycarbonate resin (to be referred to as "PC resin" hereinafter) sheet (PC-1111 sheet of Teijin Chemicals Ltd., 150×150×5 mm) to a film thickness of 5.0 μm after thermal curing by the dip coating method, left at 25° C. for 20 minutes and thermally cured at 130° C. for 1 hour.

Thereafter, the silicone resin-based hard coating agent (I-1) obtained in Reference Example 2 was applied to the coated surface of the molded sheet to a film thickness of 4.0 μm after thermal curing by the dip coating method, left at 25° C. for 20 minutes and thermally cured at 120° C. for 1 hour. The surface of the coated sheet was exposed to light (40 nW/cm²) from a xenon excimer lamp at a distance of 0.5 mm from the lamp for 1 minute to be hydrophilized.

After the titania nanosheet coating agent (II-1) obtained in Reference Example 5 was applied to a film thickness of 20 nm after hardening by the dip coating method and left at 25° C. for 5 minutes, plasma was generated by using an argon gas as a plasma carrier gas at a process vacuum degree of 0.5 Pa, an RF power at 13.56 MHz of 3,600 W and an electrode area of 3,600 cm² by means of a volume bonded internal electrode type plasma generator and applied to the surface of the coated molded sheet for 7 minutes to harden it so as to obtain a polycarbonate resin laminate. When the temperature of the substrate at the end of hardening was measured by means of a thermocouple attached to the surface of the substrate, it was 130° C. The evaluation results of the obtained laminate are shown in Table 2.

Comparative Example 4

A polycarbonate resin laminate was obtained by forming a nanosheet layer under the same conditions as in Example 26 without forming a hard coat layer on a PC resin sheet (150×150×5 mm). The evaluation results of the obtained laminate are shown in Table 2.

TABLE 2

| | | Hard coat layer | | | | | |
| --- | --- | --- | --- | --- | --- | --- | --- |
| | | | Colloidal silica and/or alkoxysilane hydrolyzed condensate | Hydrophilization | | Water contact angle | Nanosheet layer |
| No. | Substrate layer | Type | (wt %) | Method | Time | (°) | Type |
| Ex. 26 | PC | (I-1) | 99 | VUV exposure | 1 min. | 10 | (II-2) |
| Ex. 27 | PC | (I-1) | 99 | VUV exposure | 20 sec. | 30 | (II-2) |
| Ex. 28 | PC | (I-2) | 13 | VUV exposure | 1 min. | 10 | (II-2) |
| Ex. 29 | PES | (I-1) | 99 | VUV exposure | 1 min. | 10 | (II-2) |
| Ex. 30 | PC | (1-4) | 31 | VUV exposure | 1 min. | 10 | (II-2) |
| Ex. 31 | PC | (I-1) | 99 | VUV exposure | 1 min. | 10 | (II-1) |
| C. Ex. 4 | PC | — | 0 | VUV exposure | 1 min. | 10 | (II-2) |

| No. | Appearance | Adhesion | Pencil hardness | SW | $\Delta$Ht (1000) | Water contact angle (°) |
| --- | --- | --- | --- | --- | --- | --- |
| Example 26 | 0 | 100/100 | H | 4 | 0.9 | 40 |
| Example 27 | 0 | 100/100 | H | 4 | 0.9 | 50 |
| Example 28 | 0 | 100/100 | H | 4 | 1.0 | 40 |
| Example 29 | 0 | 100/100 | H | 4 | 1.1 | 40 |
| Example 30 | 0 | 100/100 | H | 4 | 1.1 | 50 |
| Example 31 | 0 | 100/100 | 2H | 5 | 0.9 | 30 |
| Comparative Example 4 | 0 | 100/100 | 2B | 1 | 44.0 | 70 |

Ex.: Example
C. Ex.: Comparative Example

Effect of the Invention

The laminate of the present invention has excellent abrasion resistance to physical stimuli such as dust. When the flaky metal oxide fine particles contain Ti or Nb as a constituent element, excellent antifouling property is obtained by a photocatalytic function, in addition to excellent abrasion resistance.

According to the method of forming a top coat layer of the present invention, a top coat layer having excellent abrasion resistance to physical stimuli such as dust can be formed on a substrate without baking it at a high temperature. The method of forming a top coat layer of the present invention has an advantage that it is possible to suppress the deterioration of the substrate through its exposure to a high temperature. The top coat layer obtained by the method of forming a top coat layer of the present invention has antifouling property due to a photocatalytic function, in addition to excellent abrasion resistance.

When the flaky metal oxide fine particles are hardened on the substrate for forming a top coat layer of the present invention, excellent abrasion resistance and antifouling property are obtained.

Industrial Applicability

The laminate of the present invention can be advantageously used in windows for airplanes, vehicles and automobiles, windows for construction machinery, windows for buildings, houses, garages, conservatories and arcades, head lamp lenses, optical lenses, mirrors, spectacles, goggles, sound insulating walls, lenses for traffic lamps, curve mirrors, windshields, face plates, sheets and films.

The invention claimed is:

1. A laminate comprising:
   (i) a base layer made of a thermoplastic resin selected from the group consisting of a polycarbonate resin (PC), a polymethyl methacrylate resin (PMMA), a polyethylene resin (PE) and a polyether sulfone resin (PES),
   (ii) a hard coat layer having a thickness of 2 to 30 μm, and wherein the hard coat layer is a cured resin layer of
   (A) a hard coating agent consisting essentially of:
      (A-1) an alkoxysilane hydrolyzed condensate,
      (A-2) colloidal silica, and
      (A-3) a solvent, or
   (B) a hard coating agent comprising:
      (B-1) a polyfunctional acrylic resin and
      (B-2) an alkoxysilane hydrolyzed condensate and/or colloidal silica,
      wherein the hard coating agent has a total content of colloidal silica and an alkoxysilane hydrolyzed condensate of not less than 31 wt %, wherein the alkoxysilane is methyl trimethoxysilane, and
   (iii) a top coat layer having a thickness of 5 to 20 nm and consisting essentially of flaky metal oxide fine particles, wherein the flaky metal oxide fine particles comprise at least one element selected from the group consisting of Ti, Nb, Al, Si, and Mg as a constituent element and have a thickness of 1 to 8 nm, and
   wherein the base layer, the hard coat layer and the top coat layer are formed in this order.

2. The laminate according to claim 1, wherein the top coat layer is formed by at least one method selected from the group consisting of ionizing material exposure, ionizing radiation exposure, infrared exposure, microwave exposure and high-temperature vapor exposure.

3. The laminate according to claim 1, wherein the hard coat layer is (i) formed from a hard coating agent having a total content of colloidal silica and an alkoxysilane hydrolyzed condensate of not less than 31 wt % based on the total weight of the hard coating agent excluding a solvent, wherein the alkoxysilane is methyl trimethoxysilane, and (ii) has a water contact angle of 30° or less.

4. The laminate according to claim 1 which is a window member.

* * * * *